ABSTRACT
United States Patent [19]

Craven et al.

[11] 4,245,755

[45] Jan. 20, 1981

[54] PRODUCT STORAGE SPACE APPORTIONING APPARATUS FOR PRODUCT DISPENSING MACHINES

[75] Inventors: Herman R. Craven, Prairie Village, Kans.; Leonard Bieri, Jr., Lee's Summit, Mo.

[73] Assignee: The Vendo Company, Overland Park, Kans.

[21] Appl. No.: 95,524

[22] Filed: Nov. 16, 1979

[51] Int. Cl.³ ............................................ B65G 59/00
[52] U.S. Cl. ................................................... 221/109
[58] Field of Search ............... 221/109, 108, 107, 111

[56] References Cited

U.S. PATENT DOCUMENTS

| | | | |
|---|---|---|---|
| 2,877,928 | 3/1959 | Patzer et al. | 221/109 X |
| 3,110,417 | 11/1963 | Wingate et al. | 221/111 |
| 3,797,393 | 3/1974 | Baxendale | 221/67 |

*Primary Examiner*—Allen N. Knowles
*Attorney, Agent, or Firm*—Schmidt, Johnson, Hovey & Williams

[57] ABSTRACT

Apparatus is provided for increasing the product storage capacity of selective product dispensing machines, which must handle a plurality of generally cylindrical product types with one or more product types being accommodated in significantly greater quantity than others, while retaining the operational reliability of staggered stack releasing for all product types. The apparatus utilizes a lower zone of the total product storage space available within a cabinet of any given size to provide staggered stack chambers of appropriately limited height for a maximum number of product types to be selectively handled, and utilizes the remaining upper zone of the available storage space to accommodate a maximum number of stored products of one or more preferred product types to be made available in greater quantity than others, with the preferred type products stored on superimposed inclined shelves and fed by gravity to the upper end of corresponding staggered stack compartments. A most preferred product is stored in large quantity within the upper zone, both upon a plurality of inclined shelves in each of a pair of sets thereof and within a corresponding pair of vertical column chutes respectively arranged to receive products from the shelves of the corresponding shelf set and to deliver such products to a corresponding side of the upper end of the associated staggered stack chamber.

10 Claims, 3 Drawing Figures

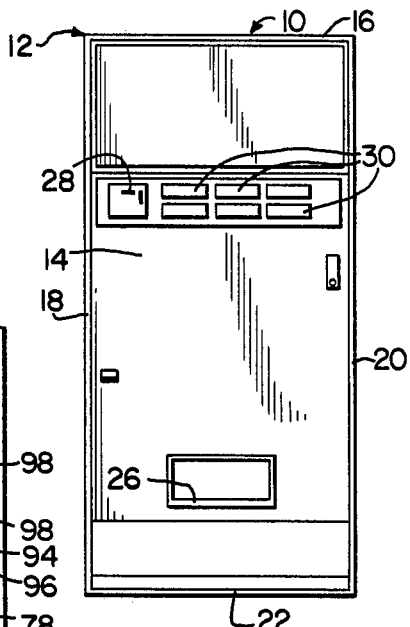
FIG. 1
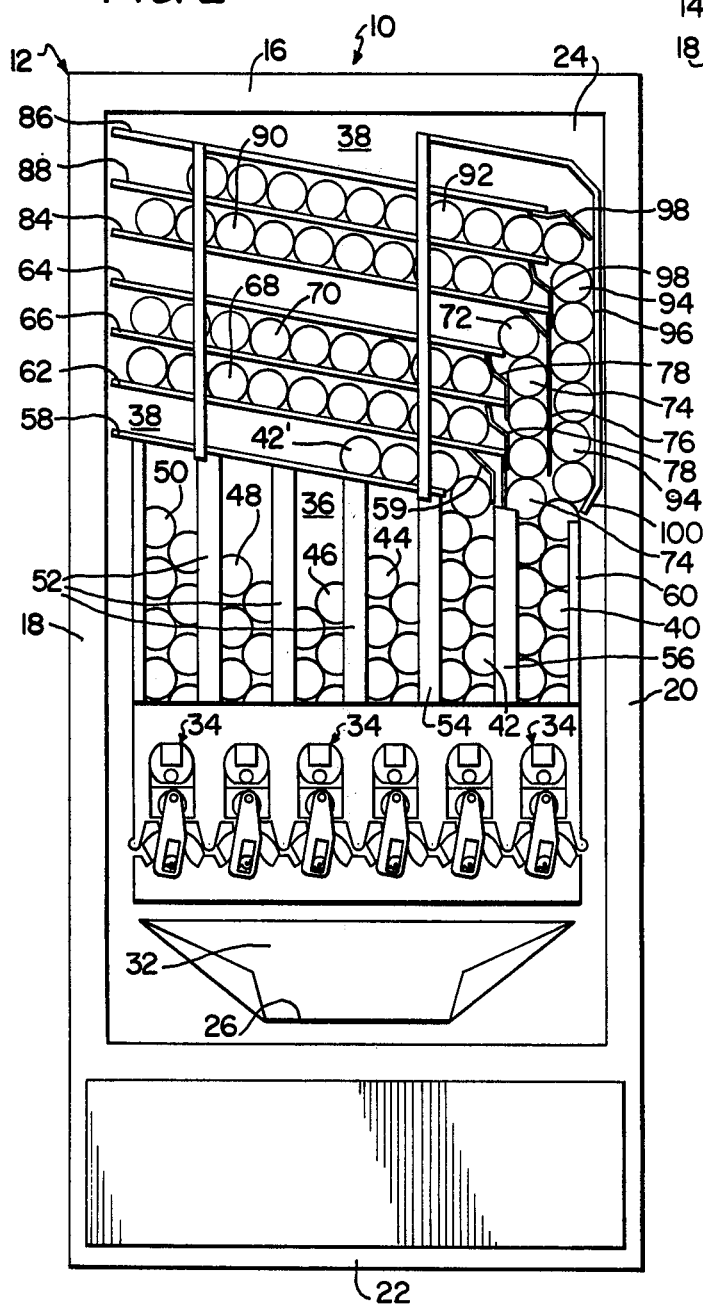
FIG. 2
FIG. 3

PRODUCT STORAGE SPACE APPORTIONING APPARATUS FOR PRODUCT DISPENSING MACHINES

BACKGROUND OF THE INVENTION

1. Field of the Invention

This invention relates to machines for selectively dispensing or vending several types of products of generally cylindrical configuration, such as products in cans or bottles. More particularly, the invention is concerned with providing improved apparatus for accommodating an increased total number of products within a limited available storage space, within the constraints of also accommodating a substantially greater number of at least one preferred product type than of other product types and assuring equal reliability of dispensing operation for all product types. In a still more specific sense, the invention provides product supporting, guiding and releasing means in an improved combination and interrelationships for optimumly apportioning the available space within a given cabinet to satisfy the mentioned constraints within a selective machine handling several product types.

2. Description of the Prior Art

The organization of the various essential elements of product dispensing or vending machines is, in a practical context, influenced by a number of sometimes conflicting considerations, including efficient utilization of the space available for the storage of products to be dispensed, the reliable control over the releasing of individual products from storage upon demand and without vulnerability to either fraudulently induced or mechanical malfunction caused dispensing of more than one product during each dispensing cycle, and providing appropriate means for guiding products during feeding thereof from storage to the product releasing means in manner minimizing vulnerability to jams and preferably utilizing gravity as the sole force required for accomplishing such feeding of products.

As will be apparent, a maximum number of products can normally be stored within a space of given volume by utilizing the latter essentially as a box or hopper with the products emplaced therein in interengaging random fashion. Such hopper approach to the storage of products to be mechanically dispensed, however, has been found highly vulnerable to the creation of jams as the stored products move toward the lower extremity of the hopper during the successive dispensing operations, and it has also proved difficult to provide a form of product releasing mechanism for use at the lower end of a hopper, which is capable of reliably dispensing products stored thereabove in essentially random fashion on a successive individual basis.

Accordingly, over the years, it has become most common to provide some form of product guiding or/and supporting structure within the product storage space available in dispensing or vending machines, for the purpose of preventing the type of jamming problems that arise with open hopper storage, while preferably accomplishing this in manner that requires the interposition within the storage space of a minimum amount of guiding and support structure, which will occupy a minimum portion of the space otherwise available for the storage of the products themselves. Three general types of such product guiding or/and support structure have been commonly employed for the mentioned purpose, namely, vertical partitions or the like spaced from each other within the storage space so as to accommodate the stored products between adjacent pairs thereof in vertical columns of such products, vertical partitions or the like within the storage space, spaced from each other a greater distance than the corresponding horizontal dimension of one product but less than twice such dimension to receive the stored products within the chambers thus presented in an arrangement commonly referred to as a "staggered stack", and a set of superimposed and inclined shelves each adapted to receive a rollable row of products thereon.

Each of such techniques of product storage has spawned the development of product releasing mechanisms especially adapted for utilization with the corresponding product storage arrangement, and each of such product storage techniques and the types of product releasing mechanisms normally utilized therewith is characterized by various advantages or shortcomings dependent upon the particular application involved. Indeed, there is probably less than full unanimity among those skilled in the art as to exactly which type of product storage and releasing arrangement may be best suited for at least certain applications, which has led to proposals for various hybrid forms of apparatus, particularly for use in machines for handling only a single variety of product. Representative illustrations of this would include the Donaldson U.S. Pat. No. 2,399,105, the Holt et al U.S. Pat. No. 2,615,773, the Gale U.S. Pat. No. 2,770,393, the Gale U.S. Pat. No. 3,749,280 and the Patzer et al U.S. Pat. No. 2,877,928, the last-mentioned of which appears to suggest duplication of the arrangement advocated in a manner which might permit extension to a variety selecting operation. In brief, the Donaldson patent employs merging paths between side by side vertical column arrangements of products of the same variety in order to utilize a single product releasing mechanism with a plurality of such columns, thereby overcoming one of the usual disadvantages of vertical column arrangements; the Holt et al patent feeds products of the same variety off the lower ends of inclined shelves into a center zone in which the products tend to arrange themselves in manner seemingly having certain characteristics of a staggered stack but also characteristics of open hopper bulk storage, with product release to be accomplished with a form of staggered stack type releasing mechanism; the Gale U.S. Pat. No. 2,770,393 is similar to Holt et al, but provides means for splitting the products at the lower end of storage into a pair of side by side columns each served by a column type releasing mechanism; the Gale U.S. Pat. No. 3,749,280 advocates essentially open hopper type storage separated at its lower extremity into a pair of staggered stack type chambers each served by a staggered stack type of releasing mechanism; while the Patzer et al patent illustrates inclined shelves feeding products to a vertical column served by a column type product releasing mechanism.

None of the mentioned representative, prior arrangements, however, would appear adaptable or are known to have ever been applied to machines of the modern type in which several varieties of generally cylindrical products, such as canned beverages, must be made available to the consumer on a selective basis. Heretofore, such selective machines have most commonly employed a plurality of side by side staggered stack arrangements of products within corresponding chambers extending throughout the height of the available product storage space and each served by its own selectively operable releasing mechanism. That type of arrangement, has, indeed, proved entirely satisfactory for applications in which it is intended that each of the selectively available varieties of product will be handled by the machine in essentially equal quantities.

It has more recently come to be recognized, however, that the tastes of consumers utilizing a vending machine as a source for products such as canned soft drinks, will not result in statistically equal selection of the various varieties of products offered through a given machine. On the contrary, there is normally one kind of product that will be consumed in quantities several times as great as any other product variety offered through a given machine during any given period of typical operation. In recognition of the biased nature of consumer demand in favor of one or a small number of the product varieties commonly offered through a single dispensing or vending machine, the common prior solution has been simply to dedicate a plurality of the individual staggered stack chambers and associated releasing mechanisms to the dominant or favored products, with the remaining products each served by only a single such chamber and releasing mechanism. Although this approach will permit the product variety preferences of consumers to be in some measure compensated for, such solution has been less than fully satisfactory, because of the difficulty of providing both an adequate number of selections and an appropriate mix of the respective quantities of each of the product varieties to be made available through a particular machine. For example, assuming a machine with six staggered stack chambers of equal height across the width of the machine, each of such chambers may accommodate 16⅔ percent of the total products receivable within the product storage space of the machine, which marks the minimum percentage of the storage space to be devoted to any particular product variety with the prior approach, which also would restrict selection of the product percentage to be devoted to a favored variety to multiples of 16⅔ percent. A more typical ratio of statistical consumer demand, as actually encountered in practice, however, would require that about 9 or 10 percent of available storage be devoted to each of four secondary products, about 14–15 percent of available storage be devoted to a somewhat preferred secondary product, and that approximately 50 percent of the entire available product storage be devoted to a primary preferred product variety.

Insofar as I am aware, the product storage and releasing techniques heretofore employed or suggested by others have not permitted the efficient design and construction of dispensing or vending machines of the selectable product type based upon realistic conformity with predetermined, desired product mixes between a plurality of varieties of products to be made available through such machine.

SUMMARY OF THE INVENTION

The improved product dispensing or vending machine apparatus provided by this invention combines the usage of various prior product storage techniques in a novel manner to achieve not only a desired product mix between a preferred or dominant variety and the other remaining varieties of products to be handled, but also utilizes what is deemed to be the most efficient and reliable form of product releasing mechanisms for all varieties of products to be handled and accomplishes at least what may be considered an improved overall efficiency of utilization of available storage space for the number of varieties of products and the quantities of each to be handled.

The machine employs across a lower zone or portion of the available product storage space a plurality of staggered stack type product receiving chambers, each provided at its lower end with a corresponding staggered stack type product supporting and releasing mechanism, in order to take advantage of the high reliability and resistance to theft of that type of supporting and releasing mechanism. Such staggered stack chambers in the lower zone constitute the entire storage allocation for each of at least a majority of the product types to be handled by the machine. In the preferred embodiment chosen for illustration, a somewhat increased product storage allocation is provided for one of the secondary products through the provision of an inclined shelf communicating with the top of the staggered stack chamber for that somewhat preferred secondary product variety. The remainder of the entire upper zone of the available storage space is devoted to the storage and handling of the required additional quantities of the dominant or primary preferred product, and the structure provided for that purpose includes an upper set and a lower set of inclined shelves respectively feeding a pair of vertical column passageways which merge into and communicate with the open top of the staggered stack chamber for such dominant preferred product variety.

BRIEF DESCRIPTION OF THE DRAWING

In the drawing:

FIG. 1 is a front elevational view of a typical vending machine for dispensing cylindrical products on a selective basis into which the storage space apportioning apparatus of this invention may be incorporated;

FIG. 2 is an enlarged, somewhat schematic, front elevational view of the interior of the machine of FIG. 1, showing the manner in which a preferred illustrative embodiment of the space apportioning apparatus of the invention is applied to the handling of a dominant and preferred primary product variety, a somewhat preferred secondary product variety, and a plurality of remaining secondary product varieties; and FIG. 3 is a further enlarged, fragmentary view, with certain parts in front elevation and others in vertical cross-section, showing further details of construction of the gate means employed upon certain of the inclined shelves and the relationship thereof to one of the wall assemblies providing vertical column guides.

DESCRIPTION OF THE PREFERRED EMBODIMENT

Referring initially to FIG. 1, a product dispensing machine 10 of the coin controlled or vending machine variety is provided with a generally rectilinear cabinet 12 having a front door 14, a top wall 16, a pair of side walls 18 and 20, a bottom wall 22 and a back wall 24 (FIG. 2) defining an interior for receiving, storing and frequently refrigerating or otherwise conditioning quantities of a plurality of varieties of products to be selectively dispensed from a product delivery station 26 in response to deposit of appropriate coinage through a slot 28 and actuation of one of a plurality of product selection switch buttons 30 each corresponding to a particular variety of product handled by the machine.

Referring next to FIG. 2, which shows the interior of the machine 10 somewhat schematically, and as it would appear with the door 14 removed, one may first identify a product collection chute 32 forming a part of the product delivery station 26. The portion of the cabinet 12 beneath the chute 32 will normally house whatever refrigeration equipment or the like is needed in the particular type of machine 10 involved. Above the product collection chute 32, which will typically extend from the rear to the front of the machine 10 where the lower end of the chute 32 communicates with the product access station 26 in the door 14, are the product releasing and dispensing mechanisms 34 for each of the product varieties to be handled by the machine 10. Such mechanisms 34 will be of any type suitable for successively releasing generally cylindrical products individually from a staggered stack arrangement thereof associated with and supported by the mechanism 34. Since such mechanisms 34 are well-known to those skilled in the art, and since various equivalent forms thereof might be utilized without material effect upon the principles of the present invention, it should suffice to indicate that the type of staggered stack releasing mechanisms 34 utilized in the preferred embodiment of this invention are of the type fully disclosed in U.S. Pat. No. 3,799,393, entitled "STAGGERED STACK VENDING MACHINE", issued to the same Assignee as owns the present invention on Mar. 26, 1974, the disclosure of which is hereby incorporated herein by reference, it being necessary to herein note further only that the staggered stack product storage arrangements and the releasing mechanisms 34 employed in the practice of this invention may be either of the double depth variety referred to in U.S. Pat. No. 3,799,393 or of the earlier single depth variety also well-known in the art.

The portion of the interior of the cabinet 12 above the product releasing mechanisms 34 constitutes the product storage space available within the machine 10, which may be differentiated between a lower zone 36 immediately above the mechanism 34 and an upper zone 38 extending from just above the lower zone 36 up to the top wall 16 of the machine 10. Although it will be apparent to those skilled in the art that the present invention is not specifically so limited and that various product mixes and capacities may be provided while utilizing the principles of this invention, the particular preferred embodiment chosen for illustration is adapted to accommodate a total of six product varieties, including a primary, dominantly favored kind of product 40, a somewhat favored kind of secondary product variety 42, and four remaining, secondary product varieties 44, 46, 48 and 50. In the preferred embodiment chosen for illustration, approximately 50 percent of the entire product storing capacity of the machine 10 is to be devoted to the dominantly favored product 40, approximately 14 percent of such capacity is to be devoted to the somewhat favored secondary product 42, and each of the remaining secondary product varieties 44, 46, 48 and 50 is to be accommodated in the machine 10 to the extent of approximately 9 percent of the product capacity available. The total product capacity of the illustrative preferred embodiment will, of course, depend upon the particular dimensions of the cabinet 12 and the product types involved, but may be understood as typically totaling approximately 370 products or a little more for conventionally sized beverage can type products and typical dimensioning for the cabinet 12.

The four left-most product releasing mechanisms respectively handling the secondary product types 50, 48, 46 and 44 are juxtaposed below corresponding staggered stack chambers formed in the lower zone 36 of the product storage space by a plurality of divider partitions 52, 54 spaced across the width of the interior of the machine 10. Such chambers for the secondary products 44, 46, 48 and 50 may each accommodate approximately 32 products each, it being noted that the chambers for the products 50 and 48 are of somewhat greater height than those for the products 46 and 44, so that one or two more products may be stored for the types 50 and 48 than for the types 46 and 44, to permit some limited recognition of possible slight statistical consumer preferences among those secondary products.

Similarly, a staggered stack chamber for receiving a first quantity of the somewhat favored secondary product 42 is provided by spaced vertical partitions 54 and 56, the upper end of which chamber is open to communicate with the lower extremity of an inclined shelf 58 extending laterally and upwardly across the remaining width of the machine 10. An additional quantity of products 42' is stored in a rollable row upon the inclined shelf 58, and such products 42' will individually enter the staggered stack arrangement of the products 42 from the top, as required to replenish products 42 that have been dispensed from the bottom of the staggered stack thereof by the corresponding product releasing mechanism 34. The products 42' most reliably move naturally into a staggered stack relationship with the uppermost articles 42 when fed to the top of the staggered stack arrangement centrally of the width of the latter; accordingly, a product deflector 59 is preferably provided, with the product clearing space between the lower extremities of the shelf 58 and the deflector 59 centered relative to the width of the stack of products 42. Thus, some additional storage capacity has been apportioned to the somewhat favored secondary product 42 without interfering with storage or dispensing of any of the other products and in a manner making efficient use of the lowermost portion of the upper zone 38 of the available storage space devoted thereto. Those skilled in the art will understand, of course, that, although the invention contemplates the possibility of thus allocating some limited amount of additional storage capacity to a somewhat favored secondary product type 42, that is by no means essential, since the invention is mainly concerned with the efficient allocation of storage space between one primarily favored and heavily dominant kind of product variety 40 vis-a-vis all remaining secondary product varieties handled by the machine 10.

Attention is next directed, therefore, to the manner in which the illustrative embodiment of the improved machine 10 provides for the efficient storage and reliable gravity feeding of a quantity of the preferred primary product variety 40 of magnitude approximately as great as all of the other product types 42, 44, 46, 48 and 50 combined. Available for such purpose in the machine 10 is, of course, the rightmost staggered stack chamber defined by the partition 56 and a rightmost partition 60 in which a staggered stack of products 40 directly above and supported by the corresponding releasing mechanism 34 are disposed, and all of the remaining space in the upper zone 38 above and to the right of the limited portion thereof devoted to the storage of the additional secondary products 42'. The most natural solution would seem to be to provide an inclined shelf 62 extending from the top of the partition 56 toward the left-hand side of the machine 10 sufficiently above the inclined shelf 58 to accommodate the products 42', and then to simply utilize such remaining major portion of the upper zone 38 above the shelf 62 and to the right of the partition 56 as an open hopper communicating with the open top of the chamber containing the staggered stack of products 40. It is found in practice, however, that feeding the upper end of a staggered stack arrangement of products, as at 40, from the bottom of a hopper randomly containing similar products is unsatisfactory because of the jamming which almost inevitably occurs. In fact, it has been further found that jamming in the feeding of a staggered stack arrangement of products from the top can be most effectively avoided only if the additional products to be supplied to the top of the staggered stack are fed to the latter from a pair of side by side vertical columns, which, of course, must be merged adjacent the top of the staggered stack in order to provide the staggered stack relationship between the products involved. It will further be apparent, however, that merely providing a pair of vertical columns of products above the staggered stack of preferred products 40 would not fully utilize the space within the upper zone 38, as is desired. Finally, therefore, it has been found that the overall construction needed can best utilize, in combination with the lowermost staggered stack preferred for reliability in product dispensing, not only the pair of vertical columns of additional products above the staggered stack, but also a set of inclined shelves for each of the vertical columns respectively arranged for feeding the latter while also effectively utilizing essentially the entire remainder of the upper zone 38 of the available product storage space.

With the noted considerations in mind, the preferred construction for the product mix chosen for illustration is shown in FIG. 2 and may be described as follows, it being noted that the construction of individual components may be essentially conventional and that it is the arrangement and relationships therebetween which are of primary interest. Approximately the lower half of the available portion of the upper zone 38 is devoted to a lower set of inclined shelves, which include the inclined wall 62, an uppermost shelf 64, and one or more intermediate shelves 66 all extending from adjacent the left-hand side of the machine downwardly and toward the right, with their lowermost ends approximately aligned vertically above the partition 56. The shelves 62, 64 and 66 are respectively stocked with additional products 68, 70 and 72, all of which are of the primary preferred product variety, the same as the products 40 within the staggered stack 40 of the latter. The products 72 from the upper shelf 64 are adapted to roll off the lower extremity of the shelf 64 into the top of a left-hand vertical column of products 74, which are confined on the right by a vertical partition 76 and are vertically aligned to feed into the left side of the staggered stack of products 40 by proceeding by gravity directly into the latter. Each of the shelves 62 and 66 is provided with a swingable gate 78 (also FIG. 3) hingedly connected to the overlying shelf 64 or 66 as at 80 and having a lower extension 82 normally extending essentially vertically above the partition 56. As long as there is a product 74 in the leftmost vertical column in position engaging a gate 78 on the right of the latter, such gate 78 will remain in its normal or closed position, as illustrated in FIGS. 2 and 3. However, once the uppermost of the products 74 has moved below the extension 82 of a particular gate 78, the force of the products 68 (or 70) upon the corresponding shelf (62 or 66) will cause the associated gate 78 to swing outwardly to the right and to permit the product 68 (or 70) from such shelf 62 (or 66) to proceed into the leftmost vertical column of products 74 as the staggered stack is depleted by the dispensing of products 40 from the lower end thereof by the associated product releasing mechanism 34.

Similarly, the upper half of the portion of the upper zone 38 to be devoted to storage of the primary preferred product variety is provided with a lower inclined shelf 84, an upper inclined shelf 86, and one or more intermediate inclined shelves 88 upon which additional quantities of the preferred product variety may be stored in rollable rows during servicing of the machine 10. The products upon the shelf 84 are labelled 90 and those upon the shelf 88 are labelled 92, while, in the condition of the machine 10 illustrated, it will be understood that the products previously scored upon the upper shelf 86 have already all moved into the rightmost vertical column of products 94, which are confined into a vertical column relationship by a guide structure 96 on the right and by the partition 76 and the hinged gates 98 associated with the shelves 84 and 88 on the left. The gates 98 function in the same general fashion as described for the gates 78, and the gate 98 associated with the shelf 88 is illustrated in FIG. 2 as having already swung to its open position for clearing the products 92 to proceed upon demand from the shelf 88 into the rightmost vertical column of products 94. The vertical partition 76 is centered with respect to the width of the staggered stack of products 40 and terminates above the latter, and the right-hand guiding structure 96 for the right-hand column of products 94, which is spaced rightwardly from the partition 60, significantly bends inwardly to the left, as at 100, at a level beneath the lower extremity of the partition 76 between the two vertical columns of products 74 and 94 and above the staggered stack product arrangement 40 adjacent the top of the latter. It will be noted that since the shelves 84, 86 and 88 are somewhat longer than the shelves 62, 64 and 66, and since the rightmost vertical product column 94 is inherently of somewhat greater height than the leftmost vertical product column 74, it is significant that the merging of the columns 74 and 94 should be preferably arranged to occur in the direction from the latter toward the former so that the inwardly inclined portion 100 of the guiding structure 96 will serve to properly direct the lowermost products 94 into staggered stack relationship at the top of the chamber occupied by the products 40 even when products 94 are still being fed to such chamber after depletion of all products from the leftmost vertical column 74 thereof.

Those skilled in the art will fully appreciate that the preferred embodiment shown and described to illustrate the invention is exemplary only and that the same principles may be employed in providing improved selective product dispensing machines for accommodating differing numbers of product varieties and other product quantity mixes. It will be further appreciated that various other minor modifications or changes, particularly with respect to details of construction, might be made without departing from the gist and essence of the invention. Accordingly, it should be further understood that the invention should be deemed limited only by the scope of the claims which follow and should be interpreted as encompassing all constructions fairly regardable as mechanical equivalents of the subject matter to which such claims are directed.

We claim:

1. In apparatus for storing, gravity-feeding and selectively dispensing generally cylindrical products of a plurality of differing kinds including products of at least one kind to be accommodated in quantities greater than for products of a number of remaining kinds:

cabinet means presenting an internal product storage space of limited available volume within which said products are to be stored and from which said products are to be selectively dispensed, said space having upper and lower zones;

means presenting a delivery station below said space to which said products are to be selectively dispensed and from which dispensed products are to be made accessible to a user;

means presenting a plurality of side-by-side staggered stack type product receiving chambers in the lower zone of said space, there being a chamber for each of said kinds of products respectively for receiving and storing a first quantity of the latter in a staggered stack arrangement, the lower extremity of said chambers being open;

means presenting a staggered stack type product supporting and releasing mechanism for each of said chambers respectively, said mechanisms each being disposed adjacent the open lower extremity of the corresponding chamber and adapted for normally supporting the lowermost product in the corresponding staggered stack and thereby the other products above said lowermost product in said stack and for releasing said lowermost product and dispensing the same to said delivery station when said mechanism is actuated;

means presenting inclined shelf means including at least one inclined shelf in the upper zone of said space for receiving and storing an additional quantity of products of said one kind in a side-by-side rollable row arrangement upon said one shelf;

means including a product-clearing opening adjacent the upper extremity of the chamber for said one kind of products and product guiding structure presenting passageway means for guided movement of said additional quantity of products of said one kind by gravity from the lower extremity of said one shelf to said product-clearing opening and into the upper portion of said chamber for said one kind of products to replenish the staggered stack of the latter therein as the same are dispensed; and means for selectively actuating any of said mechanisms.

2. Apparatus as set forth in claim 1, wherein:

said product guiding structure laterally confines said additional quantity of products moving through said passageway means into a vertical column arrangement of products between the lower extremity of said one shelf and said product-clearing opening at the upper extremity of said chamber for said one kind of products.

3. Apparatus as set forth in claim 2, wherein:

said shelf presenting means includes a plurality of shelves one above the other having the lower extremities thereof substantially aligned vertically, there being swingable gate means operably associated with the lower extremities of lower ones of said shelves, said gate means comprising a part of said product guiding structure, each of said gate means being held in a normal closed position thereof to restrain products upon the associated shelf against movement off the lower extremity of the latter when there is a product in said passageway means juxtaposed at a level in blocking relationship to said gate means, each of said gate means being shiftable to an open position thereof to permit movement of products upon the associated shelf off the lower extremity of the latter and into said passageway means under the influence of gravity when there is no product in said passageway means juxtaposed at a level in blocking relationship to said gate means.

4. Apparatus as set forth in claim 3, wherein:

said chamber presenting means includes a plurality of vertical walls spaced from each other laterally across said lower zone of said space, the walls defining each of said chambers being spaced from each other a distance greater than the diameter and less than twice the diameter of the products to be accommodated by said chamber for causing quantities of said products introduced into said chamber to dispose themselves in a staggered stack arrangement under the influence of gravity.

5. In apparatus for storing, gravity-feeding and selectively dispensing generally cylindrical products of a plurality of differing kinds including products of at least one kind to be accommodated in quantities greater than for products of a number of remaining kinds:

cabinet means presenting an internal product storage space of limited available volume within which said products are to be stored and from which said products are to be selectively dispensed, said space having upper and lower zones;

means presenting a delivery station below said space to which said products are to be selectively dispensed and from which dispensed products are to be made accessible to a user;

means presenting a plurality of side-by-side staggered stack type product receiving chambers in the lower zone of said space, there being a chamber for each of said kinds of products respectively for receiving and storing a first quantity of the latter in a staggered stack arrangement, the lower extremity of said chambers being open, the upper extremity of the chambers for said one kind of products being provided with a product-clearing opening;

means presenting a staggered stack type product supporting and releasing mechanism for each of said chambers respectively, said mechanisms each being disposed adjacent the open lower extremity of the corresponding chamber and adapted for normally supporting the lowermost product in the corresponding staggered stack and thereby the other products above said lowermost product in said stack and for releasing said lowermost article and dispensing the same to said delivery station when said mechanism is actuated;

a pair of inclined shelf means disposed one above the other and each including at least one inclined shelf in the upper zone of said space for receiving and storing additional quantities of products of said one kind in a side-by-side rollable row arrangement upon each of said shelves;

means including product guiding structure presenting a pair of side-by-side passageway means for guided movement of said additional quantities of products of said one kind by gravity from the lower extremity of the shelves for each of said pair of shelf means respectively to said product-clearing opening and into the upper portion of said chamber for said one kind of products to replenish the staggered stack of the latter therein as the same are dispensed, said product guiding structure laterally confining said additional quantities of products moving through said passageway means into a pair of separate vertical column arrangements which merge together into a staggered stack arrangement adjacent said product-clearing opening at the upper extremity of said chamber for said one kind of products; and means for selectively actuating any of said mechanisms.

6. Apparatus as set forth in claim 5, wherein:

said product guiding structure includes vertical partition means disposed between said vertical column arrangements of products within said passageway means and terminating at its lower extremity adjacently above said product-clearing opening.

7. Apparatus as set forth in claim 6, wherein:

said product guiding structure for one of said vertical column arrangements of products further includes panel means having an upper vertical portion spaced from said partition means and a lower portion adjacent said product-clearing opening for urging products from said one vertical column arrangement into alternately merged relationship with products from the other of said vertical column arrangements as said product-clearing opening is approached and said products reach a level below the lower extremity of said partition means.

8. Apparatus as set forth in claim 7, wherein:

each of said shelf means includes a plurality of shelves one above the other, the lower extremities of the shelves included in each shelf means respectively being substantially aligned with each other vertically, the lower extremities of the shelves included in the upper shelf means being substantially aligned vertically with said partition means and above the latter, the lower extremities of the shelves included in the lower shelf means being spaced laterally from said partition means.

9. Apparatus as set forth in claim 8, wherein:

there is provided swingable gate means operably associated with the lower extremities of all except the uppermost one of the plurality of shelves included in each shelf means respectively, said gate means associated with shelves of said upper shelf means comprising a part of said product guiding structure for laterally confining said one vertical column arrangement of products, said gate means associated with shelves of said lower shelf means comprising a part of said product guiding structure for laterally confining said other vertical column arrangement of products, each of said gate means being held in a normal closed position thereof to restrain products upon the associated shelf against movement off the lower extremity of the latter when there is a product of the corresponding vertical column arrangement in said passageway means juxtaposed at a level in blocking relationship to said gate means, each of said gate means being shiftable to an open position thereof to permit movement of products upon the associated shelf off the lower extremity of the latter and into the corresponding vertical column arrangement in said passageway means under the influence of gravity when there is no product in said arrangement juxtaposed at a level in blocking relationship to said gate means.

10. Apparatus as set forth in claim 9, wherein:

said chamber presenting means includes a plurality of vertical walls spaced from each other laterally across said lower zone of said space, the walls defining each of said chambers being spaced from each other a distance greater than the diameter and less than twice the diameter of the products to be accommodated by said chamber for causing quantities of said products introduced into said chamber to dispose themselves in a staggered stack arrangement under the influence of gravity.

* * * * *